United States Patent

Greubel

[15] 3,658,365

[45] Apr. 25, 1972

[54] BOOK SHAPED EDUCATIONAL AMUSEMENT DEVICE

[72] Inventor: Jurgen Greubel, Schone Aussicht, Germany

[73] Assignee: Braun Aktiengesellschaft, Frankfurt/Main, Germany

[22] Filed: Sept. 24, 1970

[21] Appl. No.: 75,114

[30] Foreign Application Priority Data

Oct. 8, 1969 Germany .................. 73 MR 7671
Feb. 10, 1970 Germany .................. P 20 05 981.8

[52] U.S. Cl. ........................................ 281/31, 35/8 R
[51] Int. Cl. .................................. B42d 3/12, G09b 1/00
[58] Field of Search ............... 281/31; 283/46; 35/1, 8, 35 E

[56] References Cited

UNITED STATES PATENTS

| 2,538,085 | 1/1951 | Cotton | 35/35 E X |
| 1,193,181 | 8/1916 | Peck | 281/31 |
| 1,729,518 | 9/1929 | Newman | 281/31 |
| 781,948 | 2/1905 | Hegele | 281/31 X |
| 841,360 | 1/1907 | Tuck | 281/31 X |
| 2,694,264 | 11/1954 | Seaton | 283/46 X |

FOREIGN PATENTS OR APPLICATIONS 2,208 1914 Great Britain .................. 281/31

Primary Examiner—Wm. H. Grieb
Attorney—Ernest F. Marmorek

[57] ABSTRACT

A book shaped educational amusement device has outer covers that can be moved between open and closed positions. Three dimensional removable educational material and a message carrier such as printed sheets making reference to said educational material are disposed near each other, each on a respective cover. The material and said printed sheets in the closed position of the covers are positioned laterally relative to each other while the material projects with its face beyond the confines of the collected printed sheets towards the outer surface of an opposite cover.

6 Claims, 4 Drawing Figures

PATENTED APR 25 1972 3,658,365

INVENTOR:
JÜRGEN GREUBEL,
BY Ernst F. Marmorek
ATTORNEY.

BOOK SHAPED EDUCATIONAL AMUSEMENT DEVICE

Reference is made to my copending design U.S. Pat. application, Ser. No. D-22,334, filed Apr. 8, 1970.

BACKGROUND OF THE INVENTION

The invention relates to a book shaped educational amusement device. A large number of such devices exist, having varied contents, common to all of them, however, is the book shaped form and construction. In other words the conventional device has two outer covers with sheets which are arranged between said covers and are connected to same, said sheets containing the text and illustrations.

Fold-out plates are also used in part where the subject to be visualized is of great importance as far as it concerns the reference and can be represented in a better manner in the form of pictures and drawings. Plates are also known, consisting of pictures which can be folded one on top of the other and which, in this manner, simulate a threedimensional effect. This is the case, for example, in biology textbooks, where skeletons and the physiology of animals and humans are shown in a superimposed manner. These fold-out plates are, however, affixed to the book in a similar manner as are the other pages of the book and from a dimensional viewpoint, are already limited in their possibilities.

Moreover, where the information is directed to entire series of subjects, the book, which is made in the aforedescribed conventional manner, can no longer fulfill its task in an optimum manner. The reason being that the described possibilities with respect to graphical representations and explanations are not sufficient for said purpose. For example, in the case of subjects dealing with natural sciences, up to now the problem was solved by compiling or creating the required illustrative material in accordance with the explanations furnished in the reference book, in order to use this illustrative material in an appropriate manner in addition to studying the book itself. The task of the reference book, namely to transmit knowledge and skill in a cohesive orderly form, in an integrated system is greatly hindered by the abovementioned procedure.

Last but not least, another difficulty arises from the fact that the illustrative material which corresponds to the printed text in the book is not always readily at one's disposal.

BRIEF SUMMARY OF THE INVENTION

One of the principal objects of the present invention is to eliminate these disadvantages.

It is another object of the present invention to make it possible to have selected and properly arranged textual material, namely intelligence messages, and also so-called "practice" material, namely practical, educational material, at one's disposal in the device itself. The educational material is thus available for use alone, in each case, together with the printed text, thereby helping the reader to gain an optimum understanding of the treated subject matter.

It is a further object of the invention to provide a device which is simple and positive in operation.

It is still another object of the invention to provide a device which has relatively few mechanical parts and is relatively inexpensive to make and use.

Further objects and advantages of the invention will be set forth in part in the following specification and in part will be obvious therefrom without being specifically referred to, the same being realized and attained as pointed out in the claims hereof.

Broadly speaking, the device designed in accordance with the present invention is characterized by the fact that it may be opened and closed and carries the intelligence message including, in certain cases, illustrations as well as three dimensional practical educational material. The message carrier makes reference to the educational material. The educational material, when the covers are closed, is such that it projects with its face beyond the confines of the message carrier towards the outer surface of the opposite cover and is positioned laterally relative to the message carrier. Thus, in the closed position, the educational material with its support between the covers has a greater thickness than the message carrier.

The foregoing is carried out by insuring that the message carrier of the device which is arranged in the customary manner for reading is arranged at the inner side of one of the outer covers of the book, whereas the educational material is arranged at the inner side of the other outer cover of the device and is releasably held there. The device furthermore has a spine in a customary manner having a width such that the two outer covers of the device lie parallel to one another when the covers are closed. This design also has the advantage that the device, when viewed as a whole, has a compact appearance and is handy to use.

The message carrier may, for example, include printed matter, such as text and illustrations, but need not be restricted thereto.

In a further development, the sheets of the book are firmly connected to one another, in a conventional manner, along a common edge, while those edges which lie on the opposite side, may be held together by means of an angular butt strap. The strap is elastic and can be bent in an upward direction and is connected to the inner side of the outer cover of the device; said strap extends with its free side over the top of the message carrier. The foregoing allows for efficient handling of the device. At the same time, it permits the reader to have, in use, an unobstructed view for reading the message; yet without danger of damaging the message carrier during the opening or closing of the device.

The strap can moreover serve as a bookmark when the device is open.

The message carrier may include a plurality of sheets, and the lowermost sheets be positioned at the inner side of one of the outer covers. This is done by insertion of the bottom-most sheet into a pocket or the like. The pocket is arranged on this outer cover. This allows for later insertion of supplementary messages, such as in hand-written form.

The holding device for the educational material includes at least a portion of the inner side of the outer cover in the form of a shell or casing. The shell, which defines a cavity, that includes recesses and/or elevations, receives the educational material. For this purpose, all of the segments of the device can be coordinated in an advantageous manner with respect to shape and dimensions so that when the device is closed by closing the covers, the shell-like construction of one of the inner sides of the cover together with the educational material which is housed therein will lie either completely, or in part, next to the message carrier.

All of the aforementioned items, namely the intelligence messages and the material are contained between the covers of the device which lie substantially parallel to one another, when closed.

Thus, when the device is closed, it has the appearance of a fairly thin book in which the various study parts, namely the message and the material, are arranged in a compact form. This may be further improved by means of counter recesses or counter elevations which are provided near the intelligence messages on the inner side of the cover in locations corresponding to the elevations and recesses of the cavity on the other cover when the covers are closed, thereby providing a form-locking holding set-up for the educational material. Thus, there is rendered unnecessary any additional mounting for the individual components of the educational material located in the shell section.

Finally, in certain given cases, it may be advantageous to provide the device with an outer jacket which is either completely transparent or partially transparent. For example, such as when the portions of the educational material which can be recognized under the transparent jacket have such a form or are labeled in such manner and are arranged in their housing in such manner, that the subject matter or the title of the material therein can be deduced therefrom and it is not necessary to provide an additional graphical design of the outer book cover.

To provide means for the connection of both covers when the device is closed, also represents a further development of the device designed in accordance with the present invention. In the case of the instant invention to a greater degree than educational amusement devices produced in the conventional manner it is important to hold together firmly all the parts of the device when the covers are closed, so as to be able to transport and store same in any desired manner. For this purpose there may be used a butt strap with a push button on one cover of the device and a counter push button on the other cover.

With the above and other objects of the invention in view, the invention consists in the novel construction, arrangement and combination of various devices, elements and parts, as set forth in the claims hereof, one embodiment of the same being illustrated in the accompanying drawings and described in the specification.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

In the accompanying drawings.

Figure 1:
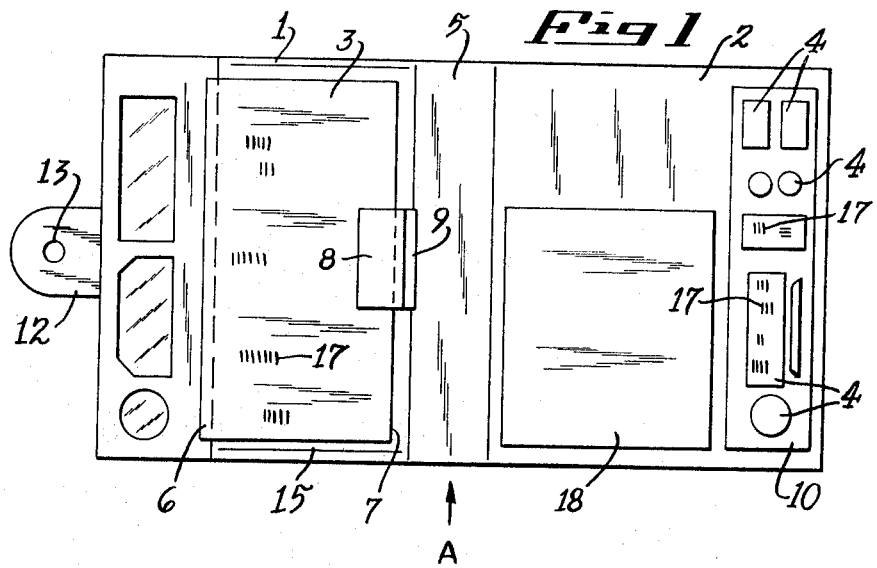
FIG. 1 is a plan view of the educational amusement device designed in accordance with the present invention in the open position.

In carrying the invention into effect in one of the embodiments which has been selected for illustration in the accompanying drawings and for description in this specification, there is provided a device having a spine 5 and outer covers 1 and 2. At the inner side of the first cover 1, a message carrier such as for instance printed sheets 3 are affixed, arranged in a customary manner for reading purposes. The educational material 4 is removable, and is arranged at the inner side of the second or outer cover 2 and held there. The printed sheets 3 are conventionally solidly attached to one another, for example glued together along their common edge 6. On the side 7 which lies opposite the edge 6, the printed sheets 3 are held together by means of a free side 8 of an elastic angular butt strap 9 which can be bent in an upward direction. This is accomplished by the free side 8 extending over the upper-most printed sheet 3. The printed sheets 3 are arranged in an orderly manner for reading purposes by their connection along the common edge 6 forming a pad. The printed sheets 3 can be affixed at the inner side of the outer cover 1 by inserting the bottom-most sheet into a pocket (not shown) which is arranged at the aforementioned inner side of cover 1. The pocket coincides with the area of the printed sheets 3. A gluing edge 15 for this pocket is indicated in FIG. 1, on the inner side of the first cover 1.

Figure 2:
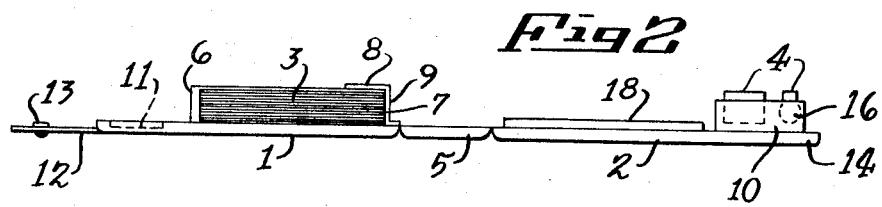
FIG. 2 is a horizontal elevational view in the direction of the arrow A of FIG. 1.

As best shown in FIG. 2 of the drawings, one portion of the inner side of the outer cover 2 has a shell or casing 10 like construction that forms a cavity that includes recesses and elevations 16, all as shown. The recesses 16 receive the individual components 4 of the abovementioned educational material 4.

There is depicted on portions of the educational material 4, as well as on portions of printed sheets 3, inscriptions, letterings or characteristic signs or other graphical illustrations 17. In a preferred embodiment there is used an electro-technical textbook, and the educational material 4 accordingly consists of different electrical component parts and other electrical accessory parts which can be grouped together into different circuit arrangements by placing them on a magnetic or magnetizable plate 18. The plate 18 forms a base for the material and is mounted on the inner side of the outer cover 2. In the foregoing arrangement the educational material 4 is magnetically attractable to each other while at the same time attractable to said plate 18. In the case of the aforementioned arrangement when said device is closed, the shell 10 of the outer cover 2 lies next to the pad of printed sheets 3, namely between the outer parallel covers 1 and 2.

When the device is closed, counter recesses 11 arranged in an appropriate location in the first cover 1, serve as a form-locking holding device for the educational material 4 which is housed in the shell 10 and lie next to the printed sheets 3 upon the closing of the device. Thus there is formed a first cavity including a series of first depressions 16, while the inner side of the first cover 1 has a corresponding series of second depressions 11 which are disposed opposite the first depressions 16 when the covers 1–2 are closed.

Figure 4:
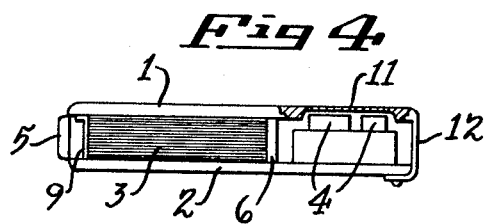
FIG. 4 is a horizontal elevational view in the direction of the arrow B of FIG. 3.

FIG. 4 shows the device in which a portion of the first cover 1 is partly cut off for easier understanding of the drawing. When the device is closed, a butt strap 12 with a push button 13, both of which are secured to the first cover 1, together with a counter push button 14, located on the outer cover 2 serve for the connection of both device covers 1 and 2. The foregoing arrangement provides for retention of all component parts of the device, so that it can be transported or set up in any desired manner.

Figure 3:
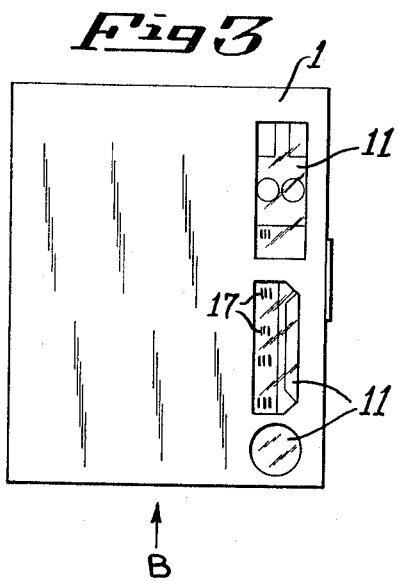
FIG. 3 is a plan view of the device in the closed position.

In a preferred embodiment of the invention, the counter recesses 11 which are provided in the cover 1 are made of a transparent material, for example a celluloid material or of a cast acrylic resin, such as a methyl methacrylate like substance, but not limited thereto. As shown in FIG. 3 one is able to view the portions of the educational material through the closed cover 2. This visible arrangement of the material 4 renders an inscription on the outer cover 1 unnecessary.

The upper-most and bottom-most parts of the printed sheets 3, all of which may be provided in the customary manner with text portions and illustrations made out of cardboard are thicker than each of the individual remaining sheets. Instead of the manner shown in FIG. 1 the common edge 6 along which the printed sheets 3 are connected to one another could also be the upper, horizontal, or shorter edge of said sheets 3.

As clearly seen in the drawings the educational material 4 when placed in its respective shell 16 has with the shell 16 a combined height greater than that of the printed sheets 3 and furthermore is able to reach into the counter recess or second depression 11 of the opposite cover.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A book shaped educational amusement device, comprising two covers movable relative to each other between open and closed positions and each cover having an inner and an outer side, a message carrier disposed adjacent one of said covers and arranged in a stacked form having a predetermined thickness, and three dimensional educational material disposed adjacent the other cover, said message including reference to said material, said material and message carrier in the closed position of said covers being positioned laterally adjacent relative to each other, and the material projecting with its face beyond the confines of said message carrier towards the outer surface of said one cover wherein said message carrier is releasably disposed on the inner side of said one cover and said educational material is releasably disposed on the inner side of said other cover, and holding means operable to connect releasably said message carrier and said educational material to the respective cover, and a spine interconnecting said covers and having a width sufficient so that the outer sides of both of said covers lie substantially parallel to each other when said device is in the closed position and a shell formed near the inner side of said other cover and defining a cavity operative to receive said educational material, wherein said cavity of said other cover includes a series of first depressions, said inner side of said one cover has a corresponding series of second depressions which are disposed opposite said first depressions when the covers are closed, said depressions in the closed cover position cooperating to lock said educational material.

2. A device, as claimed in claim 1, said message carrier including an instruction book having a plurality of sheets, and strap means mounted on the inner side of said one cover and operable to hold releasably said instruction book flat against said one cover.

3. A device, as claimed in claim 1, said message carrier including a plurality of instruction sources in sheet form, and holding means retaining the sheets releasably in position near said one cover.

4. A device, as claimed in claim 1, wherein the overall thickness of said shell and said educational material in said shell is greater than the thickness of said message carrier when said covers are in the closed position.

5. A device, as claimed in claim 1, wherein at least one of said covers includes a portion of transparent material, the respective depressions being formed on said portion, whereby the portions of educational material are visible through one of said closed covers.

6. A device, as claimed in claim 1, together with
   a magnetizable plate, said educational material being magnetically attractable to each other and to said plate so that said plate forms a base on which the material is assembled and held together magnetically.

* * * * *